US012768675B2

(12) United States Patent
Goh et al.

(10) Patent No.: US 12,768,675 B2
(45) Date of Patent: Oct. 20, 2026

(54) CODE WHEEL AND ENCODING SYSTEM WHICH CAN IMPROVE INDEX SIGNAL AND INDEX GATING MARGIN

(71) Applicant: PixArt Imaging Inc., Hsin-Chu City (TW)

(72) Inventors: Tze Wei Priscilla Goh, Penang (MY); Kuan Choong Shim, Penang (MY); Meng Yee Lim, Penang (MY); Gim Eng Chew, Penang (MY)

(73) Assignee: PixArt Imaging Inc., Hsin-Chu City (TW)

( * ) Notice: Subject to any disclaimer, the term of this patent is extended or adjusted under 35 U.S.C. 154(b) by 202 days.

(21) Appl. No.: 18/409,810

(22) Filed: Jan. 11, 2024

(65) Prior Publication Data

US 2025/0231050 A1 Jul. 17, 2025

(51) Int. Cl.
*G01D 5/347* (2006.01)

(52) U.S. Cl.
CPC .................................. *G01D 5/3473* (2013.01)

(58) Field of Classification Search
CPC ....... G01D 5/3473; G01D 5/347; G01B 11/26
See application file for complete search history.

(56) References Cited

U.S. PATENT DOCUMENTS

2010/0057392 A1* 3/2010 York .................... G01D 5/2457
702/94
2022/0163353 A1* 5/2022 Shim .................... G01D 5/3473

FOREIGN PATENT DOCUMENTS

JP 2006329783 A * 12/2006

* cited by examiner

*Primary Examiner* — Jennifer D Bennett
(74) *Attorney, Agent, or Firm* — Winston Hsu

(57) ABSTRACT

A code wheel comprising: a signal region, configured to receive light and generate at least one code signal according to the light; and an index region, configured to generate an index signal according to the light, wherein the index signal represents a complete rotation of the code wheel. The index region comprises a first region with a first region and comprises a second region with a second region larger than the first region. The first region is closer to the signal region than the second region. The code wheel may be applied to an encoding system with a processing circuit, which is configured to determine a rotation of the code wheel according to the code signals and the index signal.

17 Claims, 8 Drawing Sheets

CODE WHEEL AND ENCODING SYSTEM WHICH CAN IMPROVE INDEX SIGNAL AND INDEX GATING MARGIN

BACKGROUND OF THE INVENTION

1. Field of the Invention

The present invention relates to a code wheel and an encoding system, and particularly relates to a code wheel and an encoding system which has an index region with less index pulse width variation.

2. Description of the Prior Art

A conventional code wheel always comprises an index region for a reference of a complete rotation of the code wheel. However, assembly and spatial tolerances may impact on tagging position and pulse width of the index signal caused by the index region. In such case, the margin for index gating may be reduced, and insufficient gating margin will cause the issue of missing index or double index.

SUMMARY OF THE INVENTION

One objective of the present invention is to provide a code wheel which can generate index signals with more balanced pulses and improved index gating margin.

Another objective of the present invention is to provide an encoding system which has index signals with more balanced pulses and improved index gating margin.

One embodiment of the present invention discloses a code wheel comprising: a signal region, configured to receive light and generate at least one code signal according to the light; and an index region, configured to generate an index signal according to the light, wherein the index signal represents a complete rotation of the code wheel. The index region comprises a first region with a first region and comprises a second region with a second region larger than the first region. The first region is closer to the signal region than the second region.

One embodiment of the present invention discloses a code wheel and a processing circuit. The code wheel comprises: a signal region, configured to receive light and generate at least one code signal according to the light; and an index region, configured to generate an index signal according to the light, wherein the index signal represents a complete rotation of the code wheel. The index region comprises a first region with a first region and comprises a second region with a second region larger than the first region. The first region is closer to the signal region than the second region. The processing circuit is configured to determine a rotation of the code wheel according to the code signals and the index signal.

Another embodiment of the present invention discloses a code wheel, comprising: a signal region, configured to receive light and generate at least one code signal according to the light; and an index region, configured to generate a light pattern according to the light, wherein the index signal represents a complete rotation of the code wheel. A width of a part of the light pattern which is generated by a part of the index region which is closer to the signal region, and a width of a part of the light pattern which is generated by a part of the index region which is farer to the signal region are identical.

In view of above-mentioned embodiments, the index signal may have more balanced pulses and the index gating margin may be increased accordingly.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The term "first", "second", "third" in following descriptions are only for the purpose of distinguishing different one elements, and do not mean the sequence of the elements. For example, a first device and a second device only mean these devices can have the same structure but are different devices. Besides, the number and the arrangement of components are not limited to the examples shown in each embodiment.

Figure 1:
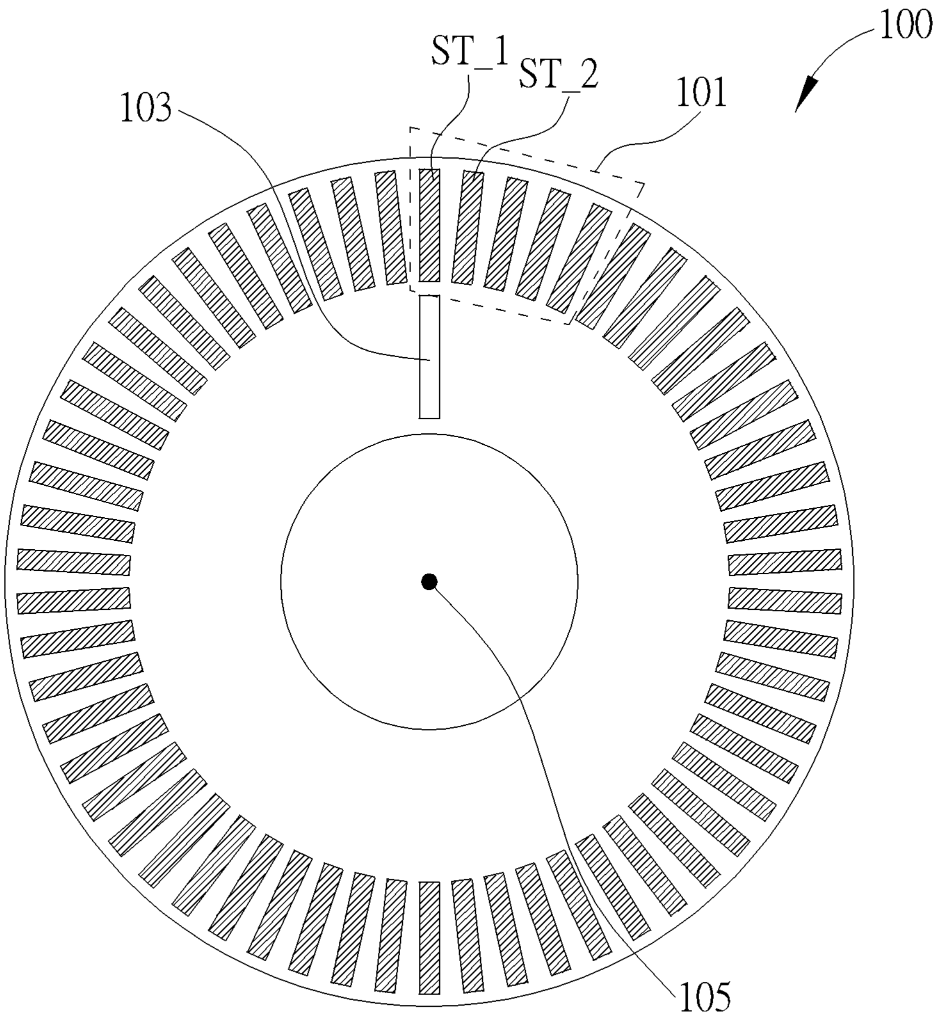
FIG. 1 is a schematic diagram illustrating a code wheel according to one embodiment of the present invention.

FIG. 1 is a schematic diagram illustrating a code wheel 100 according to one embodiment of the present invention. As shown in FIG. 1, the code wheel 100 comprises a signal region 101 and an index region 103. The signal region 101 is configured to receive light and to generate at least one code signal according to the light. The index region 103 is configured to generate an index signal according to the light. In one embodiment, the signal region 101 and the index region 103 comprise reflective materials. The index signal represents a complete rotation of the code wheel 100. In one embodiment, the signal region 101 comprises signal tracks (only two of the signal tracks ST_1, ST_2 are symbolized for explaining), which are configured to generate the code signals. In the embodiment of FIG. 1, the signal region 101 is on the outer radius of the code wheel 100 and the index region 103 is on the inner radius of the code wheel 100. In other words, the code wheel 100 comprises a circle center 105, wherein the index region 103 is closer to the circle center 105 than the signal region 101.

Figure 2:
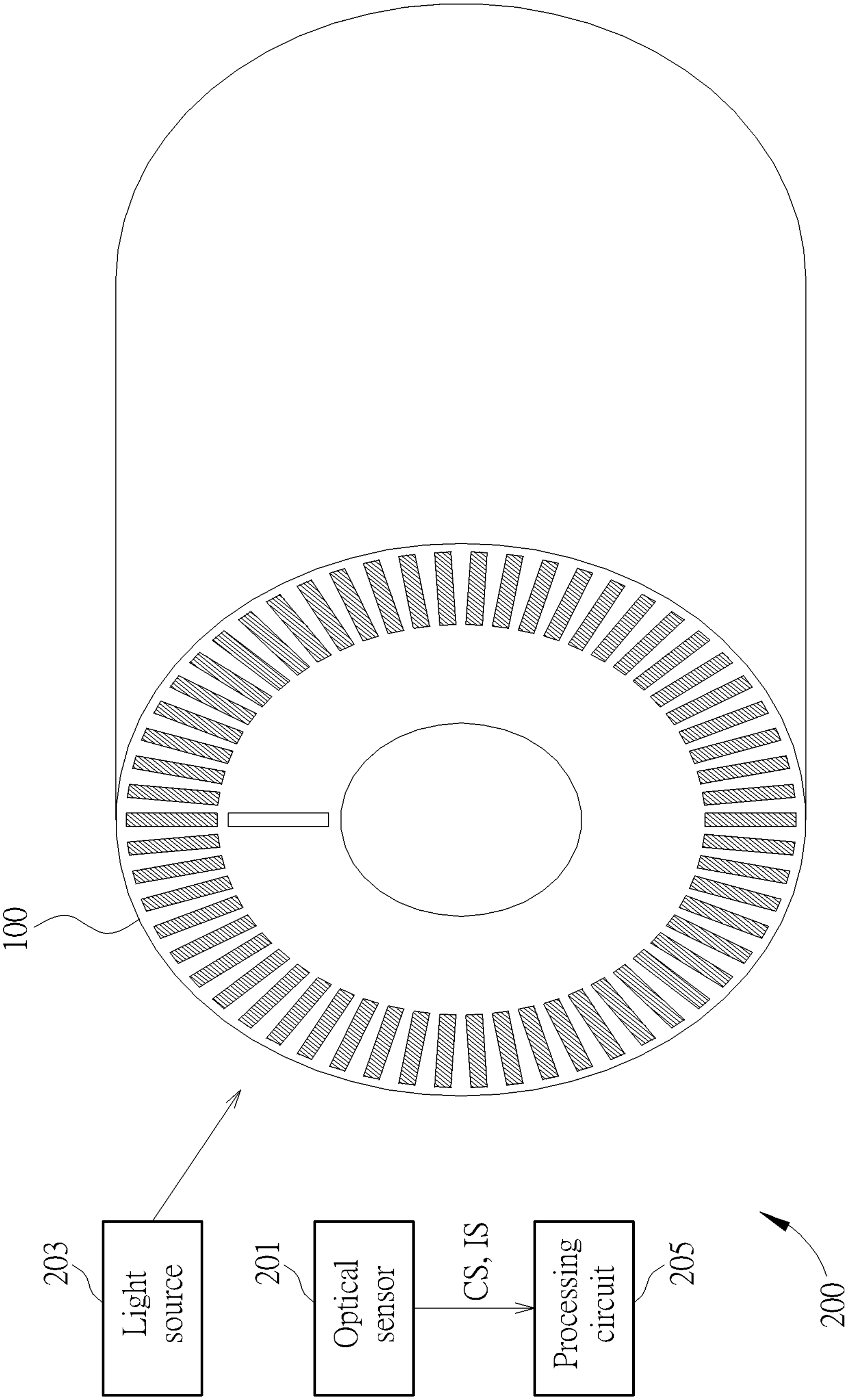
FIG. 2 is a schematic diagram illustrating an encoding system according to one embodiment of the present invention.

FIG. 2 is a schematic diagram illustrating an encoding system according to one embodiment of the present invention. As shown in FIG. 2, the encoding system 200 comprises an optical sensor 201, a light source 203 and a processing circuit 205. The light source 203 is configured to emit the above-mentioned light L and the optical sensor 201 (e.g., an image sensor or a photo detector) is configured to receive the light reflected by the signal region 101 and the index region 103. The processing circuit 205 is configured to determine a rotation of the code wheel 100 according to the code signals CS and the index signal IS.

Figure 3:
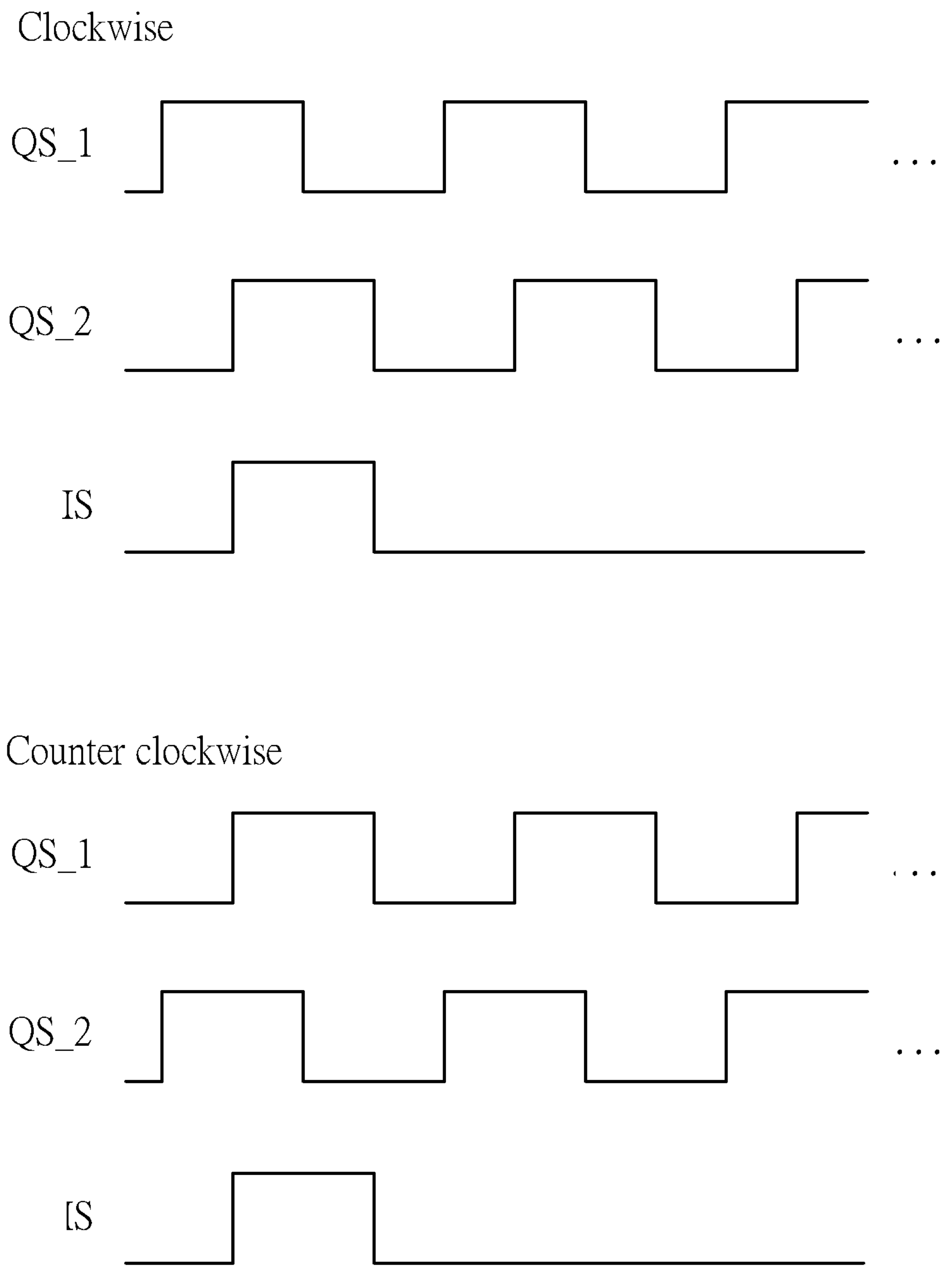
FIG. 3 and FIG. 4 are schematic diagrams illustrating signals generated by the code wheel according to different embodiments of the present invention.

In one embodiment, the signal tracks ST_1, ST_2 are configured to generate a first quadrature signal (or named as a channel A signal) and a second quadrature signal (or named as a channel B signal) as the code signals CS. In such case, the signal tracks ST_1, ST_2 maybe coded ninety electrical degrees out of phase. In applications of direction sensing, a controller such as the processing circuit 205 in FIG. 2 can determine the direction of movement based on the phase relationship between the first quadrature signal and the second quadrature signal. As illustrated in FIG. 3, when the code wheel 100 is rotating in a clockwise direction, the first quadrature signal QS_1 leads the second quadrature signal QS_2. On the opposite, when the code wheel 100 is rotating in a counterclockwise direction, the second quadrature signal QS_2 leads the first quadrature signal QS_1. The index signal IS, which is generated by the index region 103, is produced once per complete revolution of the code wheel and maybe used to locate a specific position during a 360° revolution.

Figure 4:
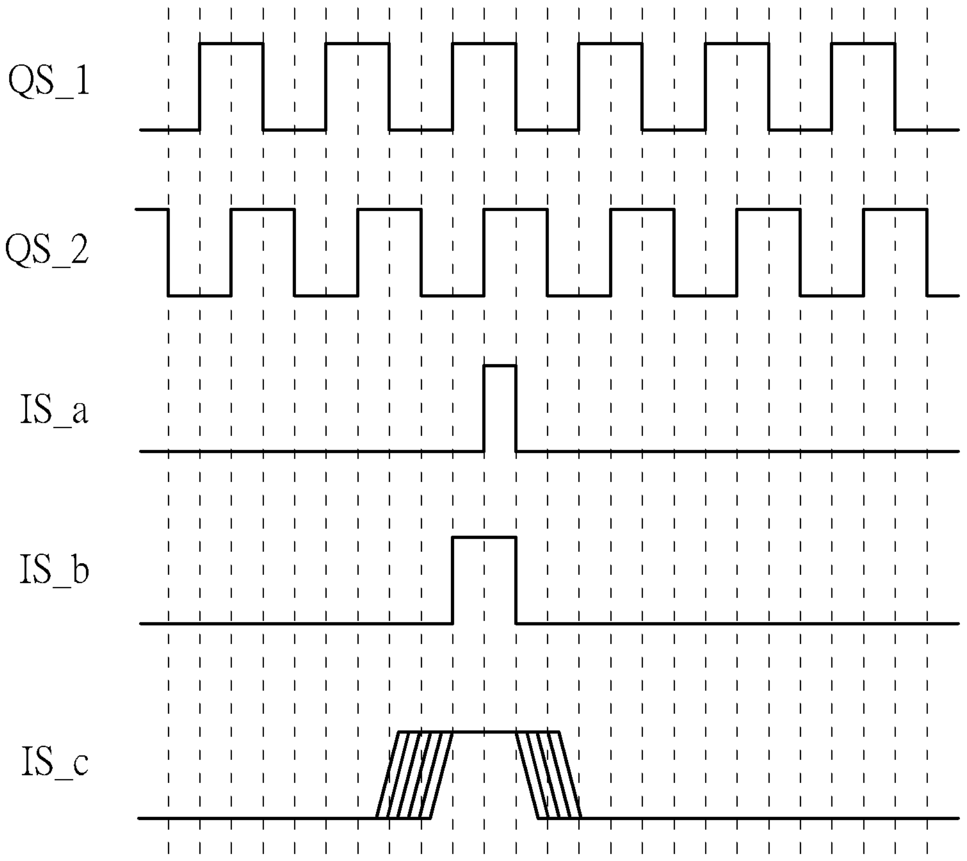

The encoding system 200 illustrated in FIG. 2 may operate in two modes, one is a gated mode and the other is an un-gated mode. FIG. 4 is a schematic diagram illustrating signals generated by the code wheel according to different embodiments of the present invention. In the embodiment of FIG. 4, the index signal IS a is gated with the product of the first quadrature signal QS_1 and the second quadrature signal QS_2 in the gated mode. Also, the index signal IS b is gated with only the first quadrature signal QS_1 in the gated mode. Additionally, in the embodiment of FIG. 4, the index signal IS c is un-gated in the un-gated mode. Briefly, the index signal is gated by at least one of the code signal in the gated mode is not gated in the un-gated mode, by the processing circuit 205 in FIG. 2.

The index signal may have different gating phases. For example, if the index signal is gated for 360°, the index signal may have a high logic level with a maximum width. On the opposite, if the index signal is gated for 90°, the index signal may have a high logic level with a smaller width. As above-mentioned, assembly and spatial tolerances may reduce the margin for index gating, which means the possible gating phase is limited. For example, the index signal could not be gated over 340°, or the issue of missing index or double index may happen.

Figure 5:
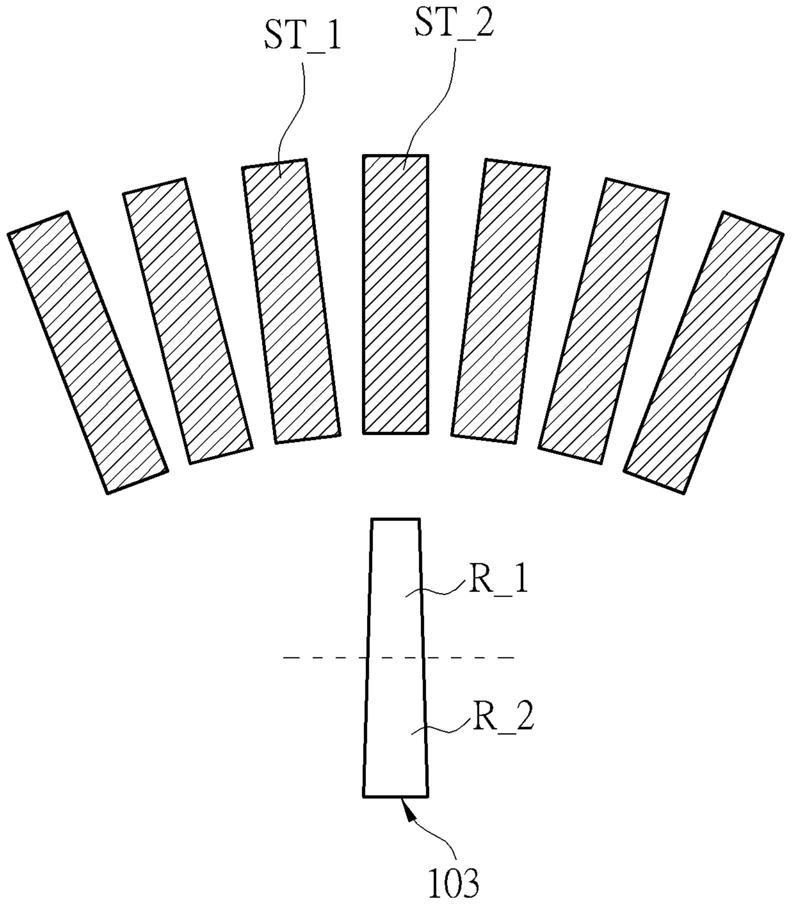
FIG. 5 is a schematic diagram illustrating signal tracks and an index region according to one embodiment of the present invention.
Figure 6:
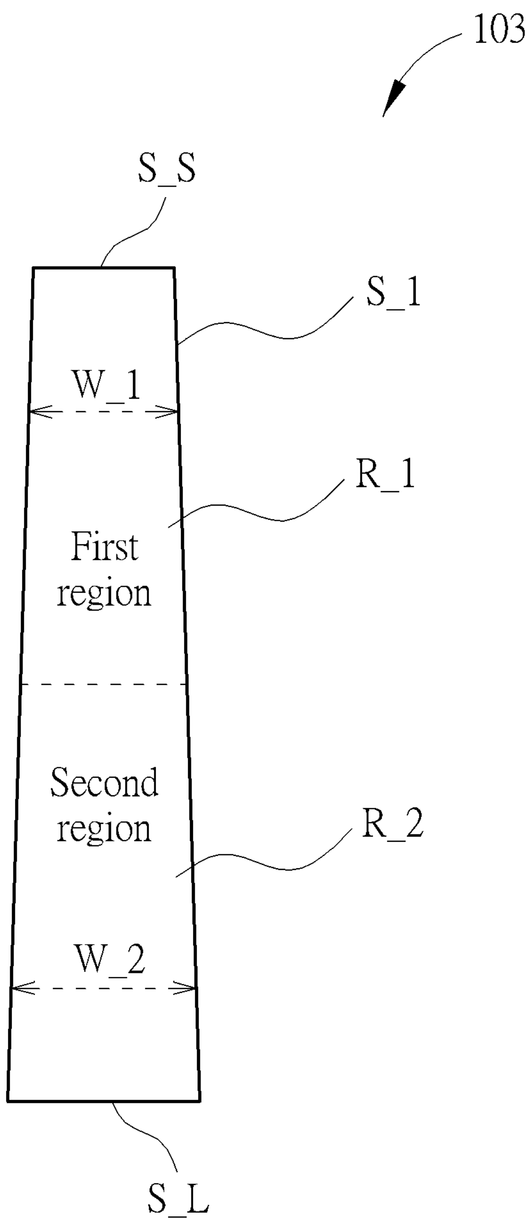
FIG. 6 and FIG. 7 are schematic diagrams illustrating index regions according to different embodiments of the present invention.

In order to provide a better index gating margin, a design of the index region 103 is disclosed in following embodiments. FIG. 5 is a schematic diagram illustrating signal tracks and an index region according to one embodiment of the present invention. Specifically, FIG. 5 is a partial enlarged figure of FIG. 1. Besides, FIG. 6 is an enlarged figure of the index region 103 in FIG. 5. Please also refer FIG. 5 while referring to FIG. 6, to understand the concepts of the present invention for more clarity.

As shown in FIG. 6, the index region 103 comprises a first region R_1 with a first region and comprises a second region R_2 with a second region larger than the first region. The first region R_1 is closer to the signal region 101 than the second region R_2. That is, the first region R_1 is in an outer radius of the code wheel 100 and the second region R_2 is in an inner radius of the code wheel 100. In other words, the code wheel 100 comprises a circle center (e.g., the circle center 105 shown in FIG. 1), and the second region R_2 is closer to the circle center 105 than the first region R_1.

The embodiment illustrated in FIG. 6 may also be stated as: the first region R_1 has a first width W_1 smaller than a second width W 2 of the second region R_2. Additionally, the embodiment illustrated in FIG. 6 may also be stated as: the index region 103 is a trapezoid with a short side S_S and a long side S_L opposite to the short side S_S, wherein the short side S_S is closer to the signal region 101 (the signal tracks ST_1, ST_2) than the long side S_L. The embodiment illustrated in FIG. 6 may also be stated as: the code wheel comprises a circle center (e.g., the circle center 105 shown in FIG. 1), wherein widths of the index region 103 gradually increase following a direction from the signal region 101 to the circle center.

Figure 7:
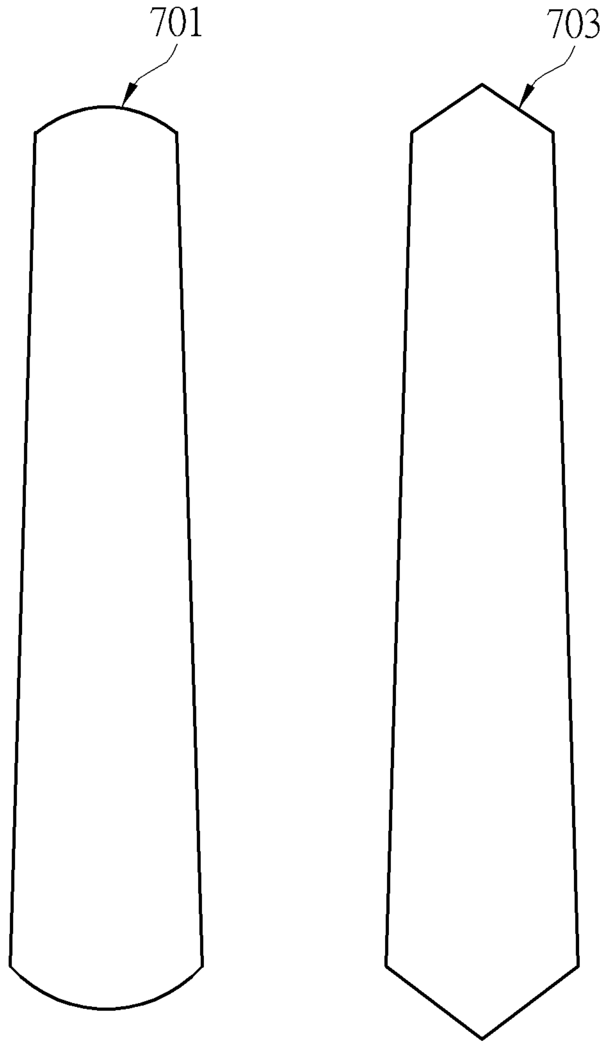

The index region may have other shapes besides the shape illustrated in FIG. 6. FIG. 7 is a schematic diagram illustrating index regions according to different embodiments of the present invention. As shown in FIG. 7, for the index region 701, the short side S_S and the long side S_L of the index region 103 in FIG. 6 are replaced by arcs. Also, for the index region 703, the short side S_S and the long side S_L of the index region 103 in FIG. 6 are replaced by polylines. It will be appreciated that the index region may be any other shape which following the rules illustrated in the embodiments of FIG. 6 and FIG. 7. Please note, the parameters illustrated in FIG. 6 and FIG. 7 may be changed corresponding to different requirements and designs. For example, in one embodiment, the side S_1 in FIG. 6 is tilted for 0.36°, and is tilted for 0.72° in another embodiment.

The index regions illustrated in FIG. 6 and FIG. 7 may reflect more light area at the inner radius and less light area at outer radius. Such design may generate a reflected light pattern which has almost identical widths at the upper part (outer radius) and at the bottom part (inner radius) when it is detected by the optical sensor 201. In one embodiment, a larger reflective area at the inner radius gives a more balance reflected pulse widths (e.g., the widths of the high logic level of the index signal) of the index signal. In other words, variation of the pulse widths of the index signal is smaller if the inner radius has a larger reflective area. Further, the index gating margin may be increased since the variation of the pulse width is reduced.

Figure 8:
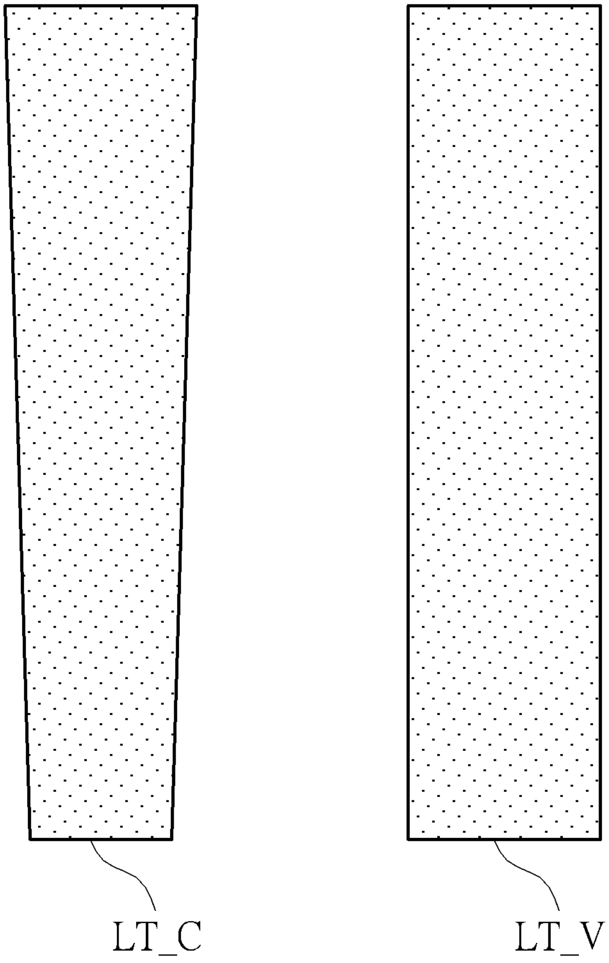
FIG. 8 is a schematic diagram illustrating a light pattern generated by a conventional index region and an index region provided by the present invention.

FIG. 8 is a schematic diagram illustrating a light pattern generated by a conventional index region and an index region provided by the present invention. More specifically, the light pattern LT_C is generated by a conventional index region and the light pattern LT_V is generated by an index region provided by the present invention. As shown in FIG. 8, the light pattern LT_C has a larger width at upper part and a smaller width at the bottom part. However, for the light pattern LT_V, the width at upper part and the width at the bottom part are the same or almost the same. In other words, a width of a part of the light pattern which is generated by a part of the index region which is closer to the signal region, and a width of a part of the light pattern which is generated by a part of the index region which is farer to the signal region are identical or almost identical. As above-mentioned, variation of the pulse widths of the index signal is smaller if the inner radius has a larger reflective area.

In view of above-mentioned embodiments, the index signal may have more balanced pulses and the index gating margin may be increased accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A code wheel, comprising:

a signal region, configured to receive light and generate at least one code signal according to the light; and an index region, configured to generate an index signal according to the light, wherein the index signal represents a complete rotation of the code wheel;

wherein the index region comprises a first region with a first region and comprises a second region with a second region larger than the first region, wherein a side of the index region is shared by the first region and the second region, and the side is tilted for 0.36° or 0.72°;

wherein the first region is closer to the signal region than the second region;

wherein the code wheel comprises a circle center, wherein the second region is closer to the circle center than the first region.

2. The code wheel of claim 1, wherein the first region has a first width smaller than a second width of the second region.

3. The code wheel of claim 1, wherein the index region is a trapezoid with a short side and a long side opposite to the short side, wherein the short side is closer to the signal region than the long side.

4. The code wheel of claim 1, wherein widths of the index region gradually increase following a direction from the signal region to the circle center.

5. The code wheel of claim 1, wherein the signal region comprises signal tracks configured to generate the code signals.

6. The code wheel of claim 5, wherein the signal tracks are configured to generate a first quadrature signal and a second quadrature signal as the code signals.

7. The code wheel of claim 1, wherein the index region is closer to the circle center than the signal region.

8. An encoding system, comprising:

a code wheel, comprising:

a signal region, configured to receive light and generate at least one code signal according to the light; and an index region, configured to generate an index signal according to the light, wherein the index signal represents a complete rotation of the code wheel;

wherein the index region comprises a first region with a first region and comprises a second region with a second region larger than the first region, wherein a side of the index region is shared by the first region and the second region, and the side is tilted for 0.36° or 0.72°;

wherein the first region is closer to the signal region than the second region; and a processing circuit, configured to determine a rotation of the code wheel according to the code signals and the index signal;

wherein the code wheel comprises a circle center, wherein the second region is closer to the circle center than the first region.

9. The encoding system of claim 8, wherein the first region has a first width smaller than a second width of the second region.

10. The encoding system of claim 8, wherein the index region is a trapezoid with a short side and a long side opposite to the short side, wherein the short side is closer to the signal region than the long side.

11. The encoding system of claim 8, wherein widths of the index region gradually increase following a direction from the signal region to the circle center.

12. The encoding system of claim 8, wherein the signal region comprises signal tracks configured to generate the code signals.

13. The encoding system of claim 12, wherein the signal tracks are configured to generate a first quadrature signal and a second quadrature signal as the code signals.

14. The encoding system of claim 8, wherein the index region is closer to the circle center than the signal region.

15. The encoding system of claim 8, wherein the index signal is gated by at least one of the code signal in a gated mode is not gated in an un-gated mode, by the processing circuit.

16. A code wheel, comprising:

a signal region, configured to receive light and generate at least one code signal according to the light; and an index region, configured to generate a light pattern according to the light, wherein the index signal represents a complete rotation of the code wheel, wherein a side of the index region is tilted for 0.36° or 0.72°;

wherein the code wheel comprises a circle center, wherein widths of the index region gradually increase following a direction from the signal region to the circle center.

17. The code wheel of claim 16, wherein the index region is a trapezoid with a short side and a long side opposite to the short side, wherein the short side is closer to the signal region than the long side.

* * * * *